Nov. 11, 1958 C. A. WALTON 2,860,326
POSITION INDICATING DEVICE
Filed Aug. 22, 1955 6 Sheets-Sheet 1

FIG_1

INVENTOR.
CHARLES A. WALTON
BY *Paul M. Brannen*
AGENT

Nov. 11, 1958

C. A. WALTON 2,860,326

POSITION INDICATING DEVICE

Filed Aug. 22, 1955

INVENTOR.
CHARLES A. WALTON
BY Paul M. Brannen

AGENT

United States Patent Office 2,860,326
Patented Nov. 11, 1958

2,860,326

POSITION INDICATING DEVICE

Charles A. Walton, Owego, N. Y., assignor to International Business Machines Corporation, New York, N. Y., a corporation of New York Application August 22, 1955, Serial No. 529,615

5 Claims. (Cl. 340—347)

This invention relates to position indicating devices, and more particularly to an improved position indicating device for obtaining electrical output signals indicative of the position of a mechanical member.

It is often desirable to translate the position of a shaft or other mechanical member to discrete electrical signals representative of the position of the member. A particular example resides in obtaining electrical signals indicative of the indication of a pointer on a weighing scale, so that the electrical signals may be employed to actuate a printing mechanism to record the indicated weight on a suitable record. In such devices, the torque available at the pointer shaft is relatively small, and it is necessary to employ an arrangement for detecting the shaft position which will not impose an undesirable additional load on the shaft.

In the prior art, there have been proposed arrangements in which one or more brushes attached to a mechanical member contact stationary contacts arranged in suitable patterns so that different circuit connections are established at different positions of the member. However, such arrangements impose an additional load on the member as a result of the friction between the brushes and the stationary contacts, and in some cases, require slip ring connections to energize shaft-carried brushes, so that the slip rings constitute an additional load for the shaft, as well as increasing the complexity and cost of the device.

Other proposed arrangements provide a brush or set of brushes carried by the member, which brushes are normally clear of the stationary contacts, and are mechanically depressed to contact the stationary contacts when it is desired to read out the position of the member electrically. It is necessary to maintain the brush holder stationary during readout in order to avoid changing of values by extraneous motion of the brushes. Should the brushes be held at a position in which they fail to properly contact the stationary contacts, either or no reading or an ambiguous reading may result.

An object of the present invention is to provide a position indicating device suitable for operation by low powered mechanical members.

Another object of this invention is to provide a shaft position indicator which may readily be adapted to any drum or circular type of weighing scale and which will not affect the accuracy of the scale.

A further object of this invention is to provide a position indicating device employing a stationary electrical contact pattern which may have all necessary connections therefor on one side only of an insulating mounting or backing plate, leading to economical manufacture and increased reliability.

Another object of this invention is to provide a position indicating device of the type employing movable brushes which engage a stationary contact pattern, in which the brushes are shifted by a small increment, when necessary, to establish proper contact with the stationary contact pattern, to thereby insure a valid reading.

Still another object of the invention is to provide a position indicating device in which a stationary contact test pattern cooperates with brushes operated by a mechanical member to indicate whether or not other brushes are properly positioned to provide a valid readout.

A further object of the invention is to provide a position indicating device which is adapted to check the position of a mechanical member to insure that a proper readout can take place, and to correct the position of the member if necessary to insure a proper readout, without decreasing the inherent accuracy of the apparatus.

Another object of the invention is to provide a position indicating device including means for correcting small displacements of a mechanical member from positions which give non-ambiguous readings.

A principal object of the invention is to provide an improved means for translating the position of a movable member to discrete electrical signals.

Other objects of the invention will be pointed out in the following description and claims and illustrated in the accompanying drawings, which disclose, by way of examples, the principle of the invention and the best mode, which has been contemplated, of applying that principle.

Figure 1:
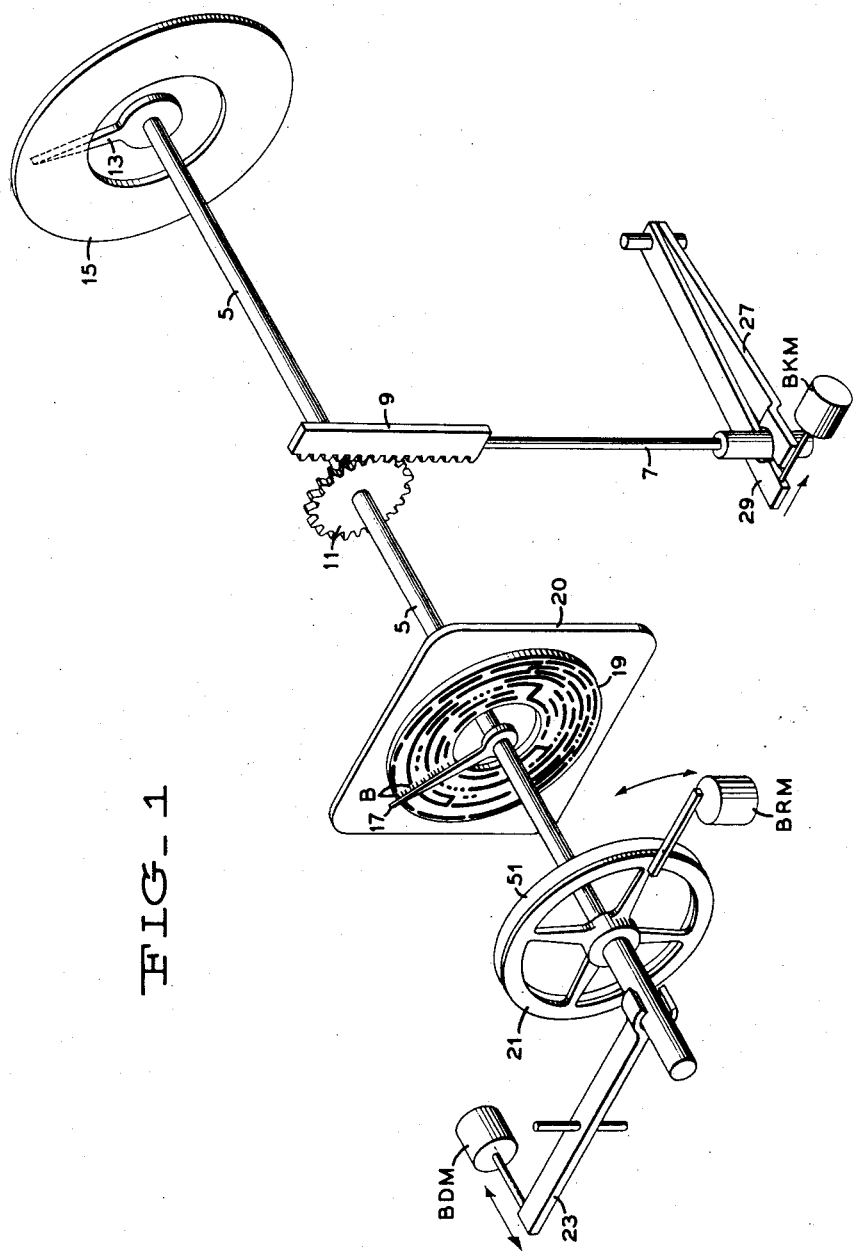
Fig. 1 is a simplified schematic illustration of a position indicating device constructed in accordance with a preferred embodiment of the invention, for indicating the angular position of a shaft.

Briefly explained, a position indicating device constructed in accordance with this invention comprises a movable brush arm operatively connected to a movable member by suitable means so that the brush arm moves in synchronism with the movable member. A plurality of interconnected brushes mounted on the brush arm are arranged to normally move clear of a stationary contact pattern when the brush arm is moving.

With the brush arm stationary, the brushes are brought into contact with the stationary contact pattern by movemen of a brush depressing member, which brush depressing member is normally in a retracted position in which it does not contact the brush arm.

When the brush arm is depressed, the brushes establish electrical connections between portions of the stationary contact pattern to thereby establish one or more combinational circuits indicative of the position of the movable member.

A feature of the invention is the provision of a stationary contact pattern in which the common contact portions indicative of an order of magnitude are located in alternating or staggered positions along the pattern, and the digit indicating contact portions for each of the orders are smilarly staggered in position. Two sets of brushes are employed to establish connections between the common contacts and the digit contacts for each order, the parts being proportioned and arranged so that the brushes alternately connect the appropriate contacts at successive reading positions. This arrangement permits all of the necessary connections to be made on the obverse side of the pattern, whereas in conventional arrangements, certain connections would have to be made on the reverse side of the pattern. Since contact patterns of this type are preferably made by printed circuit techniques, the use of a pattern which requires no extra connection on the reverse side of the insulating mounting plate is advantageous, since the manufacturing cost is reduced and the reliability of the circuits is increased.

Another feature of the invention is the provision of a test or check pattern of stationary contacts, arranged so that an electrical test signal can be provided when a pair of auxiliary brushes on the brush arm close or open a circuit through the test pattern, indicating that the remaining brushes are positioned on the contact pattern at a location which will provide a valid and non-ambiguous output signal.

The test signal supplied by the action of the test pattern and its cooperating brushes may be employed to provide a suitable alarm or to prevent readout of the non-valid values, or it may be employed to provide a sufficient incremental movement of the brushes so that a valid reading may be had, without exceeding the inherent error of the apparatus. To this end, means is provided for causing a slight movement of the brush depressing member, sufficient to bring the brushes into contact with the pattern at the closest point which will provide a valid readout. Thus the apparatus may be arranged so that it will not only detect errors in readout but also correct such errors.

Referring now to Fig. 1 of the drawings, there is illustrated, in schematic form, a position indicating device for indicating, by electrical signals, the weight of a load on a weighing scale. There is shown a shaft 5, adapted to be rotated to different angular positions in response to some influence, as for example, the operation of the balancing lever system of a weighing scale acting through a driving rod 7, rack 9 and pinion 11. At one end of the shaft there may be affixed a suitable pointer 13 which traverses a circular scale 15 to provide a visual indication of the shaft position, the scale being provided with suitable indicia, such as markings to indicate the weight in pounds and ounces, for example. All of this portion of the apparatus may conform to any of a number of well-known arrangements and the arrangement shown and described is simplified and employed for illustrative purposes only.

At the opposite end of the shaft from pointer 13, there is provided a brush arm 17, operatively connected to shaft 5 to be rotated by the shaft. The brush arm 17 carries a plurality of brushes designated generally by the reference character B, arranged to describe a plurality of concentric arcs or paths as the shaft 5 rotates. These paths are congruent with a like plurality of brush paths or arcs arranged in a circular stationary contact pattern designated generally by the reference character 19, and provided with a plurality of contact portions interconnected by suitable conductor elements and connected to suitable terminals, disposed in such manner that combinational circuits are closed therethrough by the brushes to indicate the position of the brush arm and hence the angular position of the shaft. The contact pattern 19 is mounted on a suitable insulating mounting or backing plate 20.

The brushes normally do not contact the pattern, so that little or no additional load is imposed on the shaft as a result of its rotating the brush arm 17.

A brush depressing member 21 in the form of a ring is provided mounted concentrically with shaft 5, and arranged so that it may be moved in an axial direction to engage the brush arm 17 and depress the brush arm sufficiently to bring the brushes into engagement with the stationary contact pattern 19. This axial motion of the brush depressing ring may be accomplished by any suitable means, such as by the motion of an actuating lever 23, suitably pivoted and connected to a brush depressing solenoid BDM, so that the ring 21 is moved axially to contact the brush arm 17 when solenoid BDM is energized, against the action of a suitable restoring means, not shown, such as a spring.

At readout time, with the brush depressing ring 21 operated to cause the brushes B to engage the pattern, an electrical signal is supplied through the brushes which cooperate with the test or check pattern, to be subsequently described in detail. A signal is accordingly provided which indicates whether or not the brushes are positioned at a location which will provide a valid readout. If the signal indicates that the brushes are not properly positioned, suitable operating means, such as the solenoid BRM, which is arranged to attract a radial extension of ring 21, is actuated to produce a small or incremental rotational movement of the brush depressing ring 21. The brush depressing ring is provided with a suitable rim 51 of rubber or other material having a high coefficient of friction when engaged with brush arm 17. Thus ring 21 engages the brush arm with sufficient friction so that the slight rotational movement of the ring is communicated to the brush arm. Sufficient play is present in the connections to allow the brush arm to follow the slight motion of the ring, so that the brushes are moved slightly, either forward or backward depending upon the arrangement of the parts, to a position where they engage the stationary contact pattern in such manner that a non-ambiguous readout may be obtained.

By making the valid areas of the test pattern, that is the areas which will provide an affirmative test signal, larger than the non-valid areas, and by arranging the parts so that the radial motion of the brush depressing ring moves the brush arm a distance equal to one-half of the smallest divisions of the stationary contact pattern, assurance is had that the brushes will always be operated to a valid readout position.

The error introduced by this arrangement is equal to one-half of the smallest divisions of angular position to which the shaft position is to be read, and this error is equal to the minimum error which is inherent in any digital system which by definition has a limited number of divisions. It is accordingly seen that the present system does not introduce any errors which are not previously inherent in the arrangement.

For the purpose of restraining the shaft operating mechanism during readout time, a suitable brake may be provided. As illustrated in Fig. 1, a solenoid BKM is arranged so that when energized, a movable brake shoe 27 cooperates with a fixed brake shoe 29 to restrain the operating rod 7 from motion.

Figure 2:
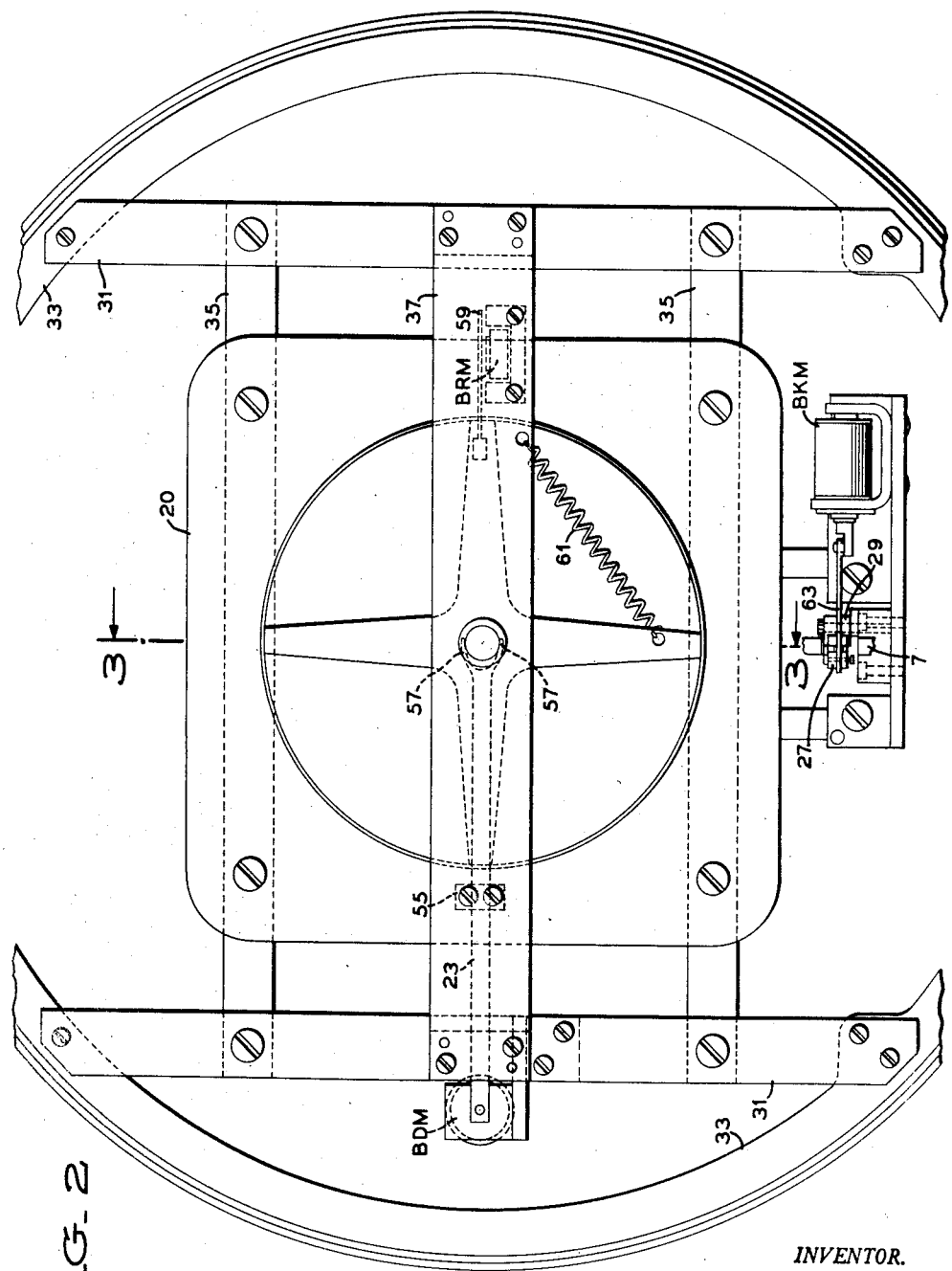
Fig. 2 is a partial rear elevation view of a position indicating device constructed in accordance with the invention, as applied to a dial-type weighing scale.
Figure 3:
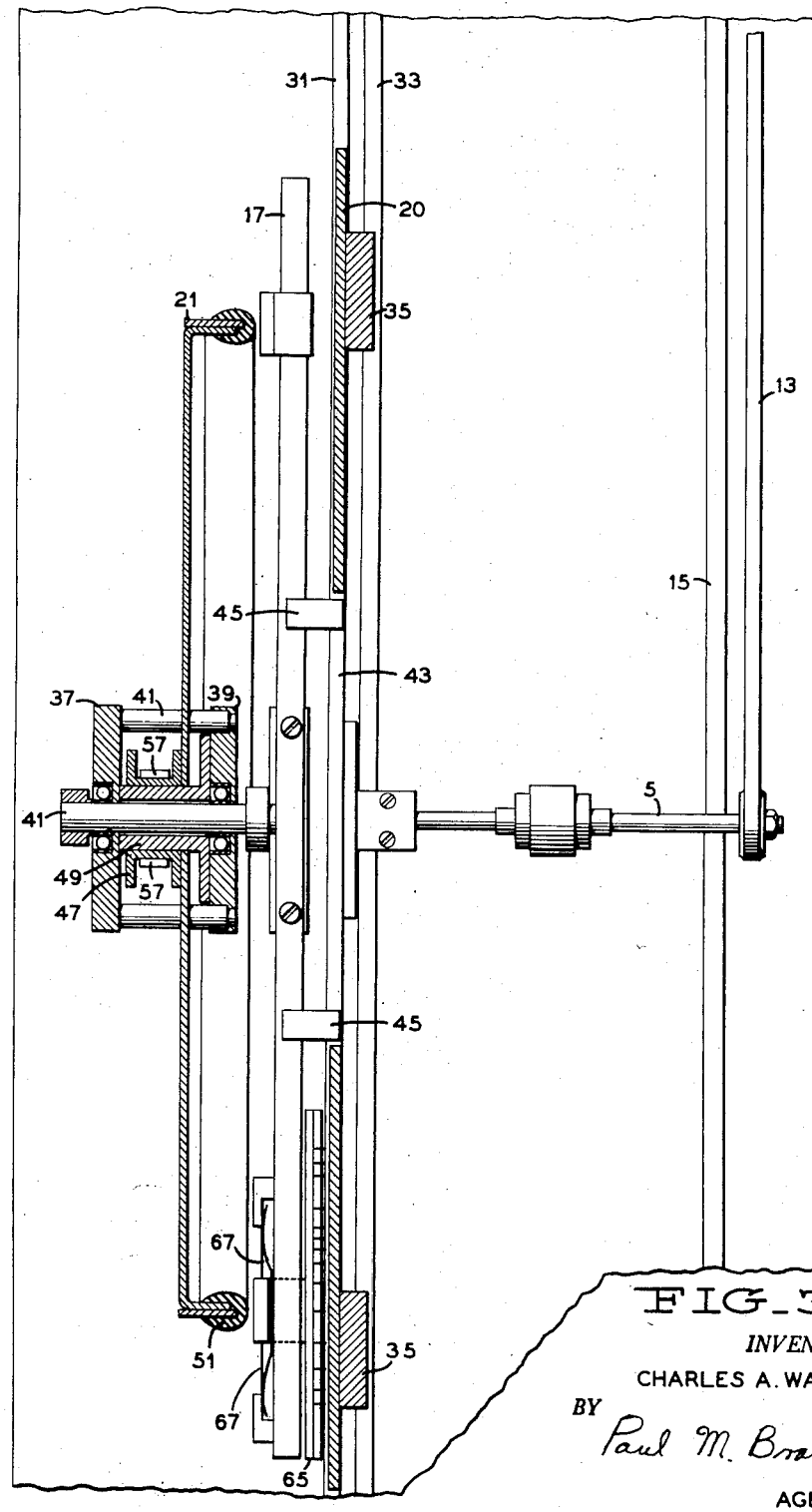
Fig. 3 is a sectional side elevation view of the arrangement illustrated in Fig. 2, taken substantially along the line 3—3 of Fig. 2.

Figs. 2 and 3 illustrate in detail the application of the apparatus according to the invention to a conventional commercial type of weighing scale. Vertical members 31 are arranged in suitable manner to be attached to the frame 33 of the scale head. Cross members 35 are attached to the vertical members 31 to provide suitable supports for the stationary contact pattern plate 20. For the sake of clarity, the stationary contact pattern is not shown in Fig. 2, nor is the brush arm 17.

A pair of supporting plates 37 and 39, spaced apart by suitable separators 41, are attached to the vertical members 31. The brush arm 17 is mounted on an auxiliary shaft 41 journaled in suitable bearings in the supporting plates 37 and 39, as can be clearly seen in Fig. 3, and the parts are arranged so that the center line of the auxiliary shaft 41 is concurrent with the center line of the scale shaft 5. A suitable coupling device such as the forked member 43 is attached to the rear end of the scale shaft 5, and is provided with fingers 45 which engage the brush arm 17 so that the brush arm 17 rotates with shaft 5. Details of the scale shaft bearings and operating mechanism have been omitted for the sake of clarity.

The brush depressing ring 21 is attached by spokes as shown, to a hub 47 arranged so that it is free to rotate about, and move axially along, a post 49, which is held between the plates 37 and 39 and through which the auxiliary shaft 41 passes. The ring 21 has at least a portion of its periphery covered with a rim 51 of suitable material having a relatively high coefficient of friction with the brush arm, such as a split rubber ring, which engages the brush arm when the ring is depressed, that is, moved from left to right as seen in Fig. 3, to engage the brush arm. The depressing movement is governed by an actuating lever 23, pivotally mounted in a suitable support 55 which is attached to plate 37. One end of the actuating lever 23 is operatively connected to the plunger of the solenoid BDM. The other end of actuating lever 23 is bifurcated, with the prongs 57 thereof engaging a groove in the collar or hub 47 of the ring 21. In this manner, energization of the solenoid BDM causes the actuating lever 23 to move the brush depressing ring to the right. A restoring spring, not shown, maintains the ring 21 in its normal or retracted position.

In order to provide an incremental rotational motion of the brush depressing ring 21 when required, an extension 59 of one of the spokes of ring 21 is provided, which may be made of suitable magnetic material, or have an armature of magnetic material attached thereto, so that when magnet BRM is energized, the extension 59 is attracted toward the magnet, thereby producing a slight clockwise rotation of ring 21. The extent of this motion may be limited by suitable adjustable stops, not shown, so that the rotation of the brush arm produced is limited to a value equal to one-half of the smallest division to be indicated, for the purposes previously explained. A restoring spring 61 attached to a spoke of ring 21 and plate 37 holds ring 21 in its normal non-rotated position.

A brush holder 65 is mounted at one end of the brush arm 17, and carries a plurality of interconnected brushes which are arranged to contact the stationary contact pattern when the brush holder is depressed by ring 21. The brush holder 65 is normally maintained in its non-contacting position by springs 67, so that the brushes contact the stationary contact pattern only when the brush depressing ring is operated into engagement with the brush holder.

Fig. 2 also shows the mechanical arrangement for the solenoid-operated brake for operating rod 7. Energization of solenoid BKM results in the movement of the solenoid plunger to the right, pulling the movable brake shoe 27 against the operating rod 7 and stationary brake shoe 29, through the connecting link 63. The rod 7 is then firmly restrained against motion during readout time.

Figure 4:
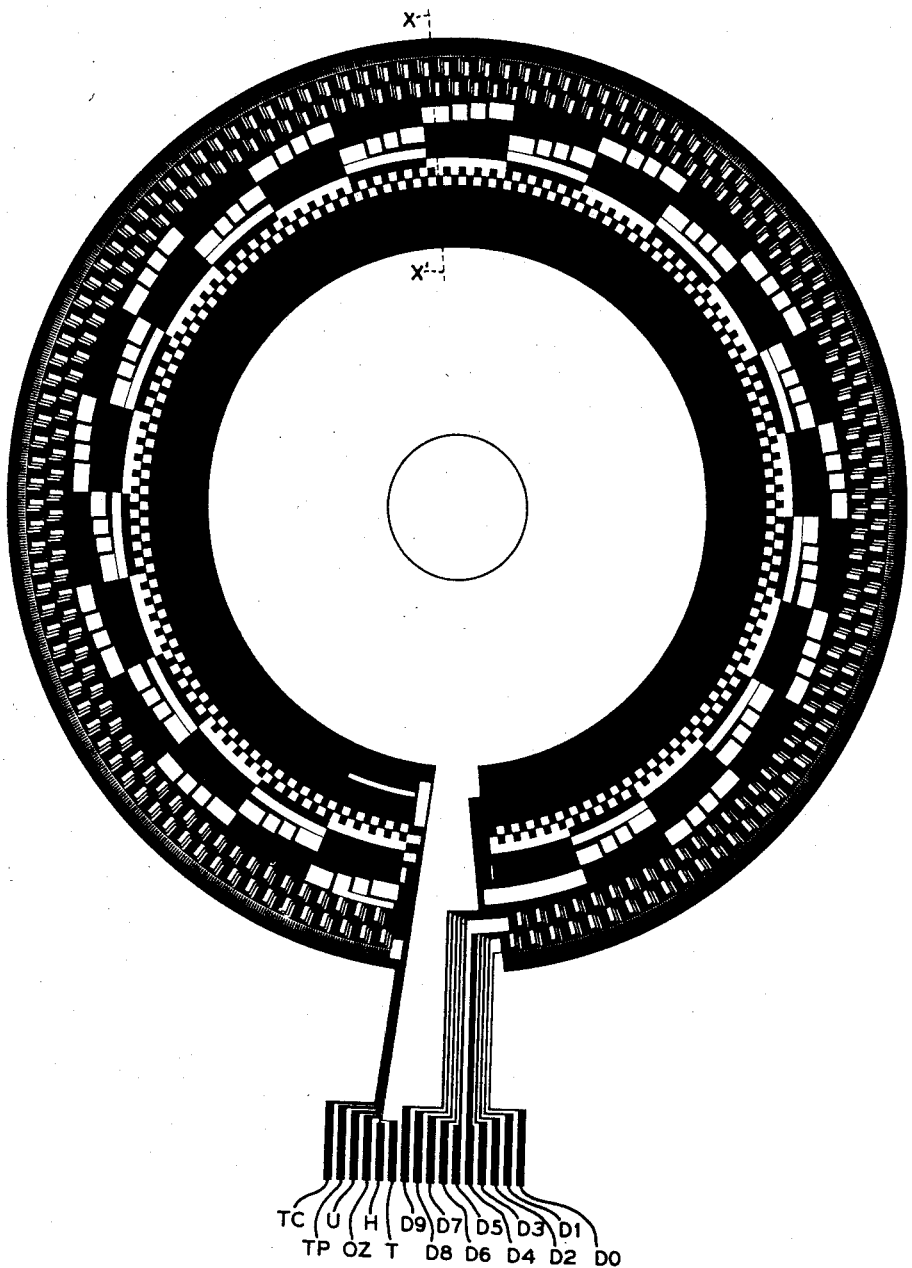
Fig. 4 is an illustration of one form of stationary contact pattern which may be employed in this device.

Referring now to Fig. 4, there is shown an illustration of a suitable stationary contact pattern constructed in accordance with the invention. The contact pattern shown in Fig. 4 is arranged for use with a weighing scale having a range from 0 to 125 pounds, in 2 ounce increments, but the invention is not limited to such values, as will become apparent as the detailed description progresses.

Preferably, the stationary contact pattern as shown in Fig. 4 is constructed by well-known printed circuit techniques, so that the pattern shown would exist on one side ony of an insulating plate 20, the portions of the pattern shown in black representing conductive areas.

Figure 5:
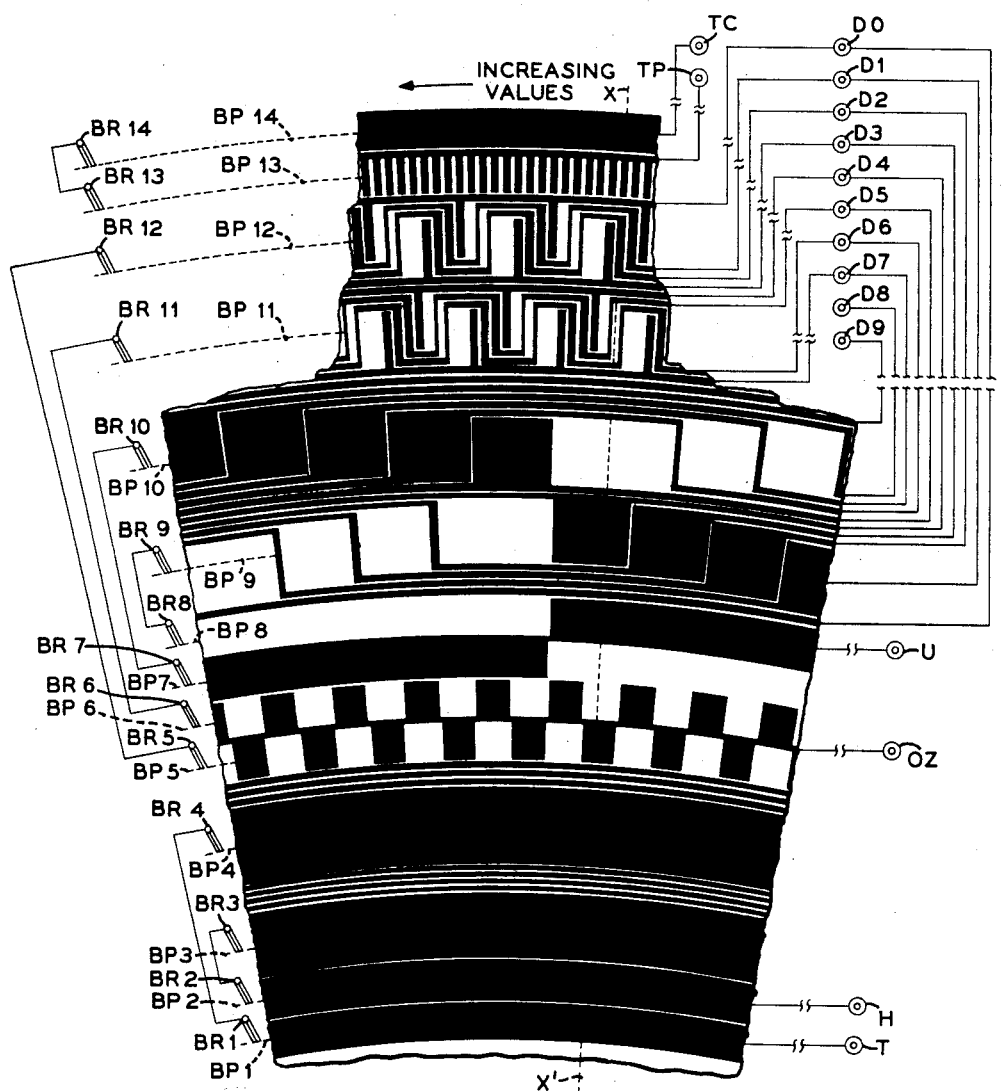
Fig. 5 is an enlarged fragmentary view showing certain details of the stationary contact pattern.

While the principal features of the stationary contact pattern will be apparent from a study of Fig. 4, the details of the pattern are more clearly seen in the enlarged fragmentary portion of the pattern which is shown in Fig. 5, together with a diagrammatic illustration of the brushes, the electrical connections between the brushes, and the electrical connections to the terminals of the pattern.

The stationary contact pattern is divided into two main portions, the position indicating portion and the test or check portion. The function of the position indicating portion is to provide suitable circuit selecting contacts which will, when connected by appropriate reading brushes, provide selective circuits indicative of the position of the reading brushes, and hence of the brush arm and shaft. The function of the test or check portion is to provide a suitable indication that the reading brushes are properly positioned to provide a valid and non-ambiguous output signal.

Considering first the position indicating portion of the pattern, there are provided a plurality of sub-patterns, one for each order of magnitude, each including a digit indicating contact pattern and a common contact pattern, adapted to be connected by suitable pairs of reading brushes as the brushes contact their respective patterns at various positions. In the present example, there are provided separate sub-patterns for values of hundreds of pounds, tens of pounds, units of pounds and 2 ounce increments on a decimal basis, that is 2 ounces is considered to have a decimal digit value of 1, 4 ounces is considered to have a decimal digit value of 2, and so on, to 14 ounces, which is considered to have a decimal digit value of 7. The contacts representative of the decimal digit values, in each of the sub-patterns, are connected to the corresponding contacts in the other sub-patterns and to a corresponding decimal digit value terminal, such as terminals designated by reference characters D0 to D9, inclusive. The common contact patterns or rings for each of the orders are brought to individual terminals designated by the reference characters H, T, U and OZ, representing the hundreds, tens and units of pounds, and ounces, in the order named.

Twelve brush paths designated by the reference characters BP1 to BP12, inclusive, are traversed by twelve associated reading brushes designated by the reference characters BR1 through BR12, inclusive. The brushes, which are carried by brush holder 65, are all aligned to contact the pattern along a radius of the pattern, and are interconnected by suitable conductors, as shown in Fig. 5.

Considering now the various sub-patterns and their brush contacts in detail, the brush path BP1 and the associated reading brush BR1 traverse the common contact for the 10's value sub-pattern, which is connected at one end thereof to terminal T. Brush BR1 is connected to brush BR4, which follows brush path BP4 traversing the digit value contact pattern for the 10's order. The 10's digit contacts are readily seen in Fig. 4, and reading counterclockwise, represent the digit values, in 10's of pounds, of 0, 1, 2, 3, 4, 5, 6, 7, 8, 9, 0, 1 and 2, since the scale is designed for the maximum load of 125 pounds. These contacts are therefore connected, by conductors, which may be traced on the pattern, to the corresponding digit terminals D0 through D9. Accordingly, when energy is supplied to terminal T, a circuit is completed to a selected one of the terminals D0 through D9, according to the position occupied by the reading brushes BR1 and BR4.

The brush paths BP2 and BP3 are traversed by brushes BR2 and BR3 which are connected together, the brush path BP2 following the common contact or ring for the 100's of pounds order, which is connected to terminal H, and the brush path BP3 following the digit value contact pattern for the 100's of pounds order. Since the scale reading has only two values of 100's of pounds, namely 0 and 1, the digit values pattern for this order is provided with only two contacts, one of which is closed when the brushes are positioned by a weight less than 100 pounds and the other of which is closed when the brushes are positioned by a weight greater than 100 pounds. These two digit contact portions are accordingly connected to the digit terminals D0 and D1, so that application of energy to terminal H will energize terminal D0 or D1, according to whether the indicated weight is less or greater than 100 pounds.

Brush paths BP5 and BP6, which are traversed by brushes BR5 and BR6, follow the common contact pattern for the ounces sub-pattern, which is connected to terminal OZ. Brushes BR5 and BR6 are connected to brushes BR12 and BR11 respectively, which traverse brush paths BP12 and BP11, which in turn follow the digit value contact pattern for the ounces order. It will be noted that the brushes BR5 and BR6 alternately contact the staggered ounces common contacts as the brushes traverse their respective brush paths. Accordingly, the common conductor for the ounces sub-pattern is alternately connected to brushes BR11 and BR12. The eight digit value contacts provided for each one pound division of the stationary contact pattern are divided into two groups, the first or outmost of the two groups having the contact portions thereof connected to the digit value terminals D0, D1, D2 and D3, and the second or innermost of the two groups having the contact portions thereof connected to the digit value terminals D4, D5, D6 and D7, as seen in Fig. 5. Thus as the brushes move along their brush paths in the direction of increasing values, brushes BR5 and BR12 are capable of establishing a connection successively between the terminal OZ and the digit value terminals D0, D1, D2 and D3, to indicate, successively, 2 ounce increments of weight from 0 to 6 ounces, for each of the 125 one-pound divisions. Similarly, brushes BR6 and BR11 are capable of establishing a connection successively between terminal OZ and the digit value terminals D4, D5, D6 and D7, to indicate, successively 2 ounce increments of weight from 8 to 14 ounces, for each of the 125 one-pound divisions.

By staggering the contacts of the stationary contact pattern in the manner shown and described, the connecting conductors which connect all like digital values of the pattern together and to the appropriate digit terminals may be interleaved or wound in and out along the pattern as shown, thus permitting all connections to be on the obverse side of the pattern. Although one or the other of the brushes BR11 and BR12 may contact these inter-contact connections, it will be seen from the drawing that when either of these brushes is positioned to make it contact one of the interconnecting conductors, the associated common brush BR5 or BR6 will not contact the common pattern, so that no false connection can be established. Thus the alternating or staggered arrangement of the position-indicating contacts, connected to a similar alternating or staggered common contact pattern by a first and a second pair of brushes, provide an arrangement which permits the spaces between the staggered contacts to be employed for connecting conductors which would otherwise have to be placed on the reverse side of the pattern.

Brush paths BP7 and BP8, which are traversed by brushes BR7 and BR8, follow the common contact pattern for the units or pounds order sub-pattern, which is connected to terminal U. Brushes BR7 and BR8 are connected to brushes BR10 and BR9, respectively, which traverse brush paths BP10 and BP9, which in turn follow the staggered digit value contact pattern for the units or pounds sub-pattern which are connected to the digit value terminals D0 through D9. These parts are arranged in a manner similar to that of the ounces sub-pattern so that in any given 10 pound subdivision of the scale, brushes BR8 and BR9 are capable of establishing a connection successively between terminal U and terminals D0 through D4, while brushes BR7 and BR10 are capable of establishing a connection successively between terminal U and terminals D5 through D9, as the brushes are advanced to successive positions of increasing values of weight. As previously pointed out, this staggered arrangement of the contact pattern permits the like valued digit value contacts to be connected by conductors which are all on the obverse side of the pattern.

The other main portion of the stationary contact pattern is the test or check pattern. As shown in Figs. 4 and 5, this pattern comprises a test or check common contact, which is the outmost ring of the pattern connected to terminal TC, followed by brush path BP14 and the associated test brush BR14, and a test contact pattern which is followed by brush path BP13 and brush BR13. The test contact pattern provides a contact portion for each of the smallest divisions of the position-indicating contact pattern. In the present example, with a scale range of 0 to 125 pounds to be read in 2 ounce increments, it can be seen that there are 1000 different readings which are valid, so that the test contact pattern has 1000 contact portions, all connected together and to terminal TP. Each of the contact portions of the test pattern is located so that when the test brush BR13 is in contact therewith, the reading brushes BR1 through BR12 will be properly positioned to provide a valid reading, i. e., the reading brushes are all contacting the pattern at points which will establish connections from the order terminals H, T, U and OZ, to selected digit indicating contacts of the position indicating portion of the pattern, so that suitable connections are established to energize selected ones of the digit value terminals D0 through D9. It can be seen, therefore, that a connection will be established between terminals TP and TC when and only when a connection is established by brushes BR13 and BR14 between one of the test pattern contacts and the test common contact, indicating that a valid and non-ambiguous readout may be obtained.

A suitable electrical circuit connected to the terminals TP and TC may be employed to provide an alarm if the test pattern indicates an improper positioning of the brushes, or may be employed, as herein described, to actuate auxiliary positioning means to move the brushes sufficiently so that a proper readout may be obtained. By making the contact portions of the test pattern larger than the intervals therebetween, and arranging the auxiliary positioning mechanism so that the incremental motion of the brushes is equal to one-half the distance from center to center of the test contacts, the movement of the brushes to a valid readout position is insured. The maximum error incurred by such an arrangement is equal to one-half of the smallest scale division, in the present case 1 ounce, since the smallest increment of the scale is 2 ounces. This error is the same as the unavoidable error in any scale having a finite number of divisions, so that the total error is not increased by use of this arrangement.

As an illustration of the manner of operation of the stationary contact pattern and the associated brushes, let it be assumed that the shaft of the scale is rotated by a load to a position where the brushes are standing at the point designated by the dotted line X—X' in Figs. 4 and 5. When the brushes are depressed so as to contact the stationary contact pattern, the following connections will be established. Brushes BR13 and BR14 will establish a connection between terminals TP and TC, indicating that the brushes are properly positioned for a valid readout, brushes BR2 and BR3 establish a connection between terminals H and D0, indicating a value of 0 hundreds of pounds, i. e., less than 100 pounds; brushes BR1 and BR4 establish a connection between terminals T and D6 indicating a value of 6 tens of pounds, i. e., 60 pounds; brushes BR8 and BR9 will establish a connection between terminals U and D4, indicating a value of 4 units of pounds, i. e., 4 pounds; and brushes BR5 and BR12 will establish a connection between terminals OZ and D2, indicating a value of 2 two-ounce increments, or 4 ounces. The indicated weight, therefore, is equal to 64 pounds, 4 ounces.

The connections which are established between the order terminals H, T, U and OZ, and the digit value terminals D1 through D9 may be scanned by any appropriate type of scanning circuit, so that, for example, the order terminals are energized in succession and the energization of the digit terminals for each order is indicated, or conversely, the digit value terminals are energized in succession and the energization of the order terminals is indicated.

Figure 6:
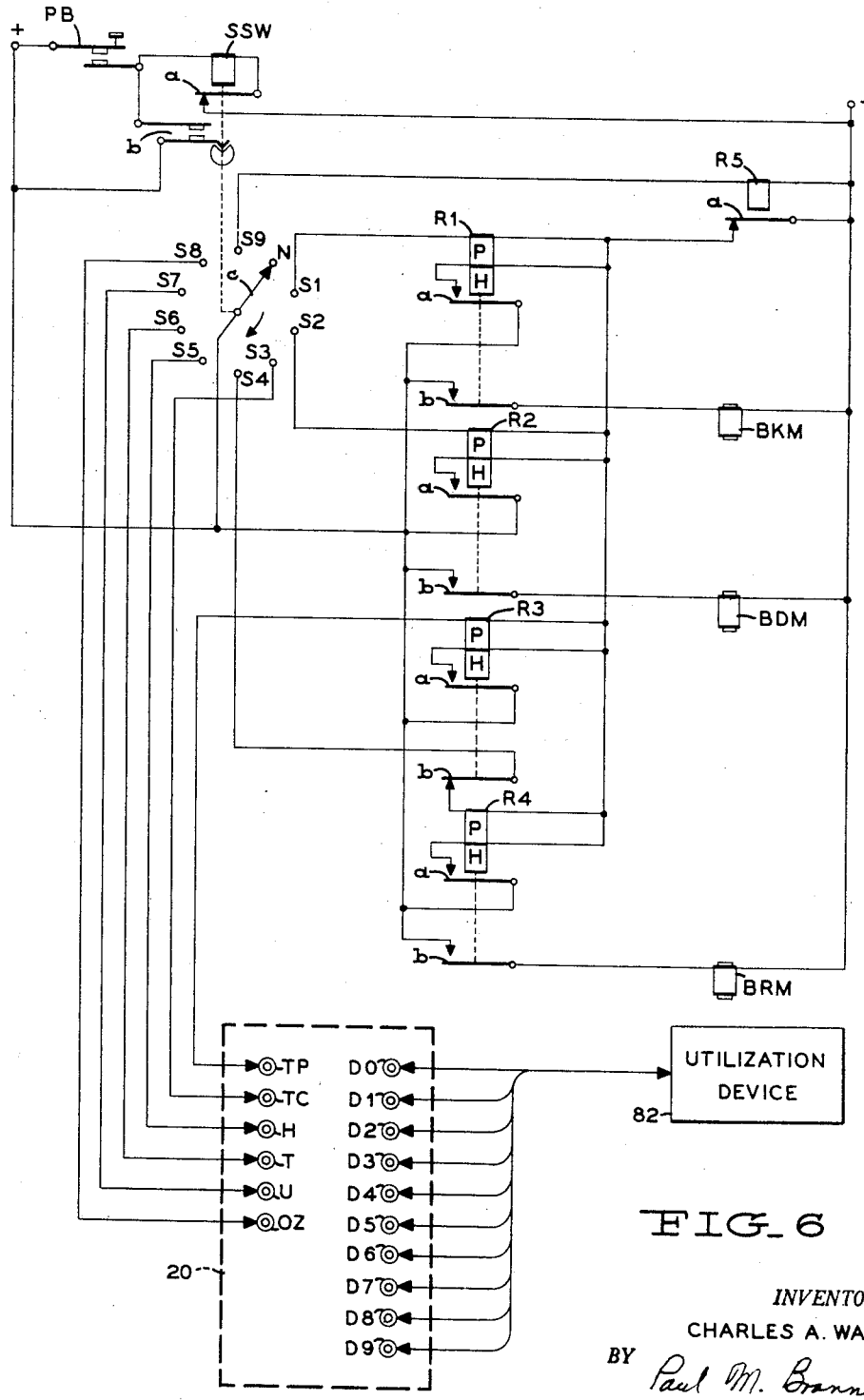
Fig. 6 is a schematic illustration of one arrangement of electrical circuits which may be employed with the apparatus.

One arrangement for the electrical circuits which may be employed with this invention is shown in Fig. 6. As shown, the electrical apparatus includes a stepping switch SSW of the conventional type arranged so that a plurality of circuits may be sequentially energized during one operating cycle of the switch, a plurality of conventional relays R1, R2, R3, R4 and R5, a suitable source of current, not shown, the positive and negative terminals of which are designated by the reference characters + and —, respectively, and a manually operated pushbutton PB for initiating the operation of the apparatus.

The apparatus is shown in its normal condition. The stepping switch SSW, which is illustrated schematically, is provided with a conventional interrupter contact SSWa which is closed when the operating magnet of the switch is de-energized, and is also provided with an off-normal contact SSWb which is open when and only when the rotary selector contact SSWc of the switch is in its normal or home position, as indicated by the reference character N in the drawing. The relays R1, R2, R3, R4 and R5, and the solenoids BKM, BDM and BRM are deenergized at this time, and no energy is being supplied to the stationary contact pattern.

Let it now be assumed that the shaft 5 has been rotated to a particular position, in consequence of a certain load being placed on the scale platform. After the pointer of the scale has come to rest in the particular position indicative of the weight of the load, or after sufficient time has elapsed to permit the mechanical parts to come to rest in the particular position, the readout cycle may be initiated by momentarily operating the pushbutton PB. During the time that pushbutton PB is closed, the operating winding of switch SSW will be energized by a circuit including the pushbutton contact, the operating winding of switch SSW and the interrupter contact SSWa. The mechanism will operate to advance the selector contact SSWc to the first of nine circuit closing positions, which are designated as S1, S2, S3, S4, S5, S6, S7 S8 and S9 respectively, in the order of their closure. Opening of contact SSWa interrupts the supply of energy to the winding of the switch, and it will continue to be recurrently energized and deenergized to step the selector contact SSWc to its successive positions. In order to maintain the supply of energy to the operating winding after the pushbutton has been released, the pushbutton contacts are bypassed by the off-normal contact SSWb, so that the switch will continue to step through its entire cycle after having once been started.

When the switch reaches its first circuit-closing position S1, its contact SSWc closes a circuit including the pickup winding of relay R1 and normally closed contact R5a. Relay R1 accordingly picks up and contact R1a establishes a holding circuit for the relay including the hold winding of relay R1 and contact R5a. Contact R1b establishes an obvious circuit for energizing solenoid BKM, which acts to clamp the rod 7 of the scale mechanism against further movement.

When the switch steps to its second circuit closing position S2, relay R2 is energized and establishes a holding circuit for itself in a manner similar to that described for relay R1. When contact R2b closes, solenoid BDM is energized and the brush depressing ring is operated to engage the brushes with the stationary contact pattern.

When the switch operates to position S3, a circuit is established for energizing the test pattern common conductor connected to terminal TC of the contact pattern. It will be assumed that the brushes are located properly so that a valid readout may be obtained. Accordingly, the test brushes will connect the test pattern common conductor to one of the segments of the test pattern, so that current is supplied therethrough and hence from terminal TP to the pickup winding of relay R3, which upon picking up, establishes a holding circuit for itself similar to those already established by relays R1 and R2.

When the switch SSW operates to position S4, contact SSWc closes in a circuit for energizing relay R4. However, since contact R3b is open at this time, relay R4 will not be energized and its contacts will remain released.

As the stepping switch operates to positions S5, S6, S7 and S8 energy is supplied successively to terminals H, T, U and OZ of the stationary contact pattern, so that the common contact patterns for the hundreds, tens and units of pounds and the ounces orders are energized in succession. Depending upon the position of the reading brushes, a selected one of the digit value contact terminals D0 through D9 will be energized at each of the reading steps, so that a series of output signals are supplied to a utilization device 82, which may be, for example, an electrically-operated typewriter or printing mechanism which is thus enabled to print the weight of the scale load. As an example, if the indicated weight is 64 pounds and 4 ounces, as previously described, then at position S5 a first pulse will be supplied to terminal D0, at position S6 a second pulse will be supplied to terminal D6, at position S7 a third pulse will be supplied to terminal D4, and at position S8 a fourth pulse is supplied at terminal D2. The four output pulses appear in succession on terminals D0, D6, D4 and D2, indicating a weight of 64 pounds and 4 ounces, since each digit value from D1 through D7 represents a 2 ounce increment.

When the stepping switch reaches position S9, relay R5 is momentarily energized and contact R5a interrupts the holding circuits for relays R1, R2 and R3. The release of these relays de-energizes the solenoids BKM and BDM. The stepping switch continues to operate until contact SSWc reaches its N or home position at which time contact SSWb opens, interrupting the supply of energy to the operating winding of the switch and completing the cycle of operation.

In the event that the reading brushes are improperly positioned so that a valid readout cannot occur, the cycle of readout operation proceeds initially as described above until position S3 is reached. At this time, the circuit for energizing relay R3 is not established since the checking brushes do not close the circuit between the test common and test pattern. As a consequence, when contact SSWc operates to position S4, it establishes a circuit including contact R3b for energizing relay R4. Contact R4a establishes a holding circuit for the relay and contact R4b establishes the circuit for supplying energy to solenoid BRM. Accordingly, the brush depressing ring is rotated to a position where a valid readout can be obtained. Thereafter, the cycle proceeds as previously described, with all relays and magnets being restored to normal at the end of the cycle.

It will be readily apparent to those skilled in the art that various other circuit arrangements may be employed. For example, it is obvious that the circuitry can be arranged in such manner that if a proper test signal is not received, the readout program is halted and an alarm actuated.

The foregoing description and the arrangements shown in the drawings are in accordance with a preferred embodiment of the invention. However, it can be seen that a number of variations are readily possible. For example, the position of a mechanical member having a motion of translation rather than rotation may be indicated by the use of a stationary contact pattern in which the brush paths are straight lines rather than arcs. Moreover, it is obvious that the incremental motion of the brushes relative to the contact pattern, for the purpose of error-correction may be accomplished by maintaining the brushes stationary and imparting the necessary movement to the contact pattern.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

What is claimed is:

1. A shaft position indicator for providing electrical signals indicative of the angular position of a shaft, comprising, in combination, a radial arm mounted on said shaft, for rotation therewith, a brush holder carried by said arm at the distal end thereof, a plurality of reading brushes and at least one test brush carried by said brush holder, a stationary contact pattern including a position indicating portion comprising a plurality of contacts arranged in a pattern corresponding to a plurality of different angular positions of said shaft, said contacts being arranged in orders of values and digit values within each order, and including a common contact pattern for each of said orders, first terminal means for said stationary contact pattern including a terminal for each of said orders connected to the corresponding common contact pattern, and a terminal for each digit value connected to the corresponding digit value contacts, whereby electrical connections indicative of order and digit numerical values are set up between said terminals when said reading brushes contact said position indicating contacts at equally-spaced predetermined points corresponding to said numerical values, said stationary contact pattern also including a test portion comprising a test common contact and a test contact pattern, said test contact pattern comprising a plurality of test contacts, one for each of said predetermined points, arranged to be connected to said test common contact by said reading brush when and only when said reading brushes contact said position indicating contacts at one of said predetermined points, second terminal means for said stationary contact pattern including a test common terminal connected to said test common contact and a test pattern terminal having a connection to each of said test contacts, whereby electrical connections are established between said test common terminal and said test pattern terminal when and only when said reading brushes are positoned to one of said predetermined points, and circuit means connected to said first and said second terminal means.

2. A shaft position indicator for providing electrical signals indicative of the angular position of a shaft, comprising, in combination, a radial arm mounted on said shaft for rotation therewith, a brush holder carried by said arm at the distal end thereof, a plurality of reading brushes and at least one test brush carried by said brush holder, a stationary contact pattern including a position indicating portion comprising a plurality of contacts arranged in a pattern corresponding to a plurality of different angular positions of said shaft, said contacts being arranged in orders of values and digit values with each order, and including a comomn contact pattern for each of said orders, first terminal means for said stationary contact pattern including a terminal for each of said orders connected to the corresponding common contact pattern, and a terminal for each digit value connected to the corresponding digit value contacts, whereby electrical connections indicative of order and digit numerical values are set up between said terminals when said reading brushes contact said position indicating contacts at equally-spaced predetermined points corresponding to said numerical values, said stationary contact pattern also including a test portion comprising a test common contact and a test contact pattern, said test contact pattern comprising a plurality of test contacts, one for each of said predetermined points, arranged to be connected to said test common contact by said reading brush when and only when said reading brushes contact said position indicating contacts at one of said predetermined points, second terminal means for said stationary contact pattern including a test common terminal connected to said test common contact and a test pattern terminal having a connection to each of said test contacts, whereby electrical connections are established between said test common terminal and said test pattern terminal when and only when said reading brushes are positioned to one of said predetermined points, a utilization device, first circuit means connected to said first terminal means for supplying electrical signals to said utilization device indicative of the position of said shaft, and second circuit means connected to said second terminal means for indicating the validity of said signals.

3. A shaft position indicator for providing electrical signals indicative of the angular position of a shaft, comprising, in combination, a radial arm mounted on said shaft for rotation therewith, a brush holder carried by said arm at the distal end thereof, a plurality of reading brushes and at least one test brush carried by said brush holder, a stationary contact pattern including a position indicating portion comprising a plurality of contacts arranged in a pattern corresponding to a plurality of different angular positions of said shaft, said contacts being arranged in orders of values and digit values with each order, and including a common contact pattern for each of said orders, first terminal means for said stationary contact pattern including a terminal for each of said orders connected to the corresponding common contact pattern, and a terminal for each digit value connected to the corresponding digit value contacts, whereby electrical connections indicative of order and digit numerical values are set up between said terminals when said reading brushes contact said position indicating contacts at equally-spaced predetermined points corresponding to said numerical values, said stationary contact pattern also including a test portion comprising a test common contact and a test contact pattern, said test contact pattern comprising a plurality of test contacts, one for each of said predetermined points, arranged to be connected to said test common contact by said reading brush when and only when said reading brushes contact said positon indicating contacts at one of said predetermined points, second terminal means for said stationary contact pattern including a test common terminal connected to said test common contact and a test pattern terminal having a connection to each of said test contacts, whereby electrical connections are established between said test common terminal and said test pattern terminal when and only when said reading brushes are positioned to one of said predetermined points, a utilization device, first circuit means connected to said first terminal, means for supplying electrical signals to said utilization device indicative of the position of said shaft, auxiliary positioning means effective when energized to move said brush holder an incremental distance equal to one-half the distance between any two of said predetermined points, and second circuit means connected to said second terminal means for governing the energization of said auxiliary positioning means.

4. In a position indicating device for electrically indicating the position of a movable member, including a plurality of aligned brushes and a plurality of contacts traversed by said brushes in response to relative motion between said brushes and said contacts governed by the motion of said movable member, the combination comprising a first and a second group of position indicating contacts staggered with respect to the line of travel of said brushes, a first and a second group of common contacts staggered with respect to the line of travel of said brushes, said first group of position indicating contacts and said first group of common contacts being aligned with respect to each other and transverse to the line of travel of said brushes, said second group of position indicating contacts and said second group of common contacts being aligned with respect to each other and transverse to the line of travel of said brushes, a first pair of brushes electrically connected and positioned to contact said first group of said position indicating contacts and said first group of common contacts, a second pair of brushes electrically connected and positioned to contact said second group of said position indicating contacts and said second group of common contacts, conductor means connecting like contacts in said first and said second groups of position indicating contacts, and conductor means connecting said first and said second groups of common contacts.

5. In a position indicating device for electrically indicating the position of a movable member including a plurality of aligned brushes operatively connected to said movable member and a stationary contact pattern traversed by said brushes to establish electrical connections according to the position of said movable member, the combination comprising, a first group of position indicating contacts disposed at a first series of spaced intervals along the path of a first one of said brushes, a second group of position indicating contacts disposed at a second series of spaced intervals along the path of a second one of said brushes, said first series of spaced intervals being alternate with respect to said second series of spaced intervals, a first group of common contacts disposed at said first series of spaced intervals along the path of a third one of said brushes, a second group of common contacts disposed at said second series of spaced intervals along the path of a fourth one of said brushes, said first and said third brushes being electrically connected, said second and said fourth brushes being electrically connected, conductor means located between the intervals of said first series for connecting like position indicating contacts in said first group of position indicating contacts, conductor means located between the intervals of said second series for connecting like position indicating contacts in said second group of position indicating contacts, and conductor means connecting all of said first and said second groups of common contacts.

References Cited in the file of this patent

UNITED STATES PATENTS

| | | |
|---|---|---|
| 2,207,743 | Larson | July 16, 1940 |
| 2,385,323 | Williams | Sept. 18, 1945 |
| 2,591,555 | Klopf | Apr. 1, 1952 |
| 2,666,912 | Gow | Jan. 19, 1954 |